United States Patent [19]

Han et al.

[11] Patent Number: 5,808,923

[45] Date of Patent: Sep. 15, 1998

[54] DENORMALIZATION DEVICE AND METHOD FOR MULTICHANNEL AUDIO DECODER

[75] Inventors: Young Tae Han; Soon Hong Kwon, both of Taejeon, Rep. of Korea

[73] Assignee: Korea Telecommunication Authority, Seoul, Rep. of Korea

[21] Appl. No.: 689,539

[22] Filed: Aug. 9, 1996

[30] Foreign Application Priority Data

Aug. 9, 1995 [KR] Rep. of Korea ................ 95-24568

[51] Int. Cl.[6] .................... G06F 7/00; G06F 17/14
[52] U.S. Cl. .................... 364/715.04; 364/725.03
[58] Field of Search .................... 364/715.02, 715.04, 364/725.01, 725.02, 725.03; 348/405, 406

[56] References Cited

U.S. PATENT DOCUMENTS

| | | | |
|---|---|---|---|
| 4,774,587 | 9/1988 | Schmitt | 358/426 |
| 4,780,761 | 10/1988 | Daly et al. | 348/408 |
| 5,604,540 | 2/1997 | Howe | 348/405 |

*Primary Examiner*—Chuong Dinh Ngo
*Attorney, Agent, or Firm*—Merchant, Gould, Smith, Edell, Welter & Schmidt

[57] ABSTRACT

A device and a method for performing a denormalization operation to restore channel signals, normalized into specified levels due to a multichannel process in an MPEG-2 multichannel audio decoder, to their original levels. The denormalization device performs the denormalization operation on the basis of one multiplication operation. To this end, the denormalization device comprises a ROM for storing therein denormalization information to be multiplied by data to be denormalized, a multiplier for multiplying the data to be denormalized, by the denormalization information stored in the ROM, and a controller for controlling the ROM and the multiplier.

6 Claims, 2 Drawing Sheets

DENORMALIZATION DEVICE AND METHOD FOR MULTICHANNEL AUDIO DECODER

BACKGROUND OF THE INVENTION

1. Field of the Invention

The present invention relates in general to a denormalization device and a method for a multichannel audio decoder, and more particularly to a device and a method for performing a denormalization operation to restore channel signals, normalized into specified levels due to a multichannel process in a moving picture experts group-2 (referred to hereinafter as MPEG-2) multichannel audio decoder, to their original levels.

2. Description of the Prior Art

The MPEG-2 has prescribed the international standards on audio and video signal compression expression methods.

Generally, in MPEG-2 layer 1 and 2 multichannel audio decoders, a channel dematrixing operation is required to perform a multichannel process. As a result of the multichannel process, channel signals are normalized into specified levels. The normalized channel signals must be multiplied by desired values so that they can be restored to their original levels. Such a multiplication operation is called "denormalization". A denormalization device is provided in the MPEG-2 layer 1 and 2 multichannel audio decoders to perform the denormalization operation.

Information regarding normalization factors multiplied by the channel signals in the previous encoding process are included in a header of the decoder input. At this time, each normalization factor is determined according to a channel dematrixing device and a channel. The denormalization device determines a channel to which the channel dematrixing device and the channel signal belong and multiplies the channel signal by a denormalization factor corresponding to the determined channel. The following table 1 shows various denormalization factors.

TABLE 1

| DEMATRIXING | CHANNEL SIGNAL | A | B | AB |
|---|---|---|---|---|
| "00", "10" | Lw, Rw | 1 | $1 + \sqrt{2}$ | $1 + \sqrt{2}$ |
| | Cw, LSw, RSw | 2 | | $2 + \sqrt{2}$ |
| "01" | Lw, Rw | 1 | $1.5 + 0.5\sqrt{2}$ | $1.5 + 0.5\sqrt{2}$ |
| | LSw, RSw | 2 | | $3 + \sqrt{2}$ |
| | Cw | 2 | | $1 + 1.5\sqrt{2}$ |
| "11" | ALL | 1 | 1 | 1 | where, A is an inverse weighting factor and B is a denormalization factor.

However, such a conventional denormalization device must perform two multiplication operations on the basis of the inverse weighting factor and the denormalization factor. The two multiplication operations make the design of the denormalization device complex.

SUMMARY OF THE INVENTION

Therefore, the present invention has been made in view of the above problem, and it is an object of the present invention to provide a denormalization device and a method for a multichannel audio decoder, in which a denormalization operation is performed on the basis of one multiplication operation.

In accordance with one aspect of the present invention, there is provided a denormalization device for a multichannel audio decoder, comprising denormalization information storage means for storing therein denormalization information to be multiplied by data to be denormalized; multiplication means for multiplying the data to be denormalized, by the denormalization information stored in the denormalization information storage means; and control means for controlling the denormalization information storage means and the multiplication means.

In accordance with another aspect of the present invention, there is provided a denormalization method for a multichannel audio decoder, comprising the first step of inputting data to be denormalized; the second step of extracting denormalization information to be multiplied by the input data; and the third step of multiplying the input data by the extracted denormalization information.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
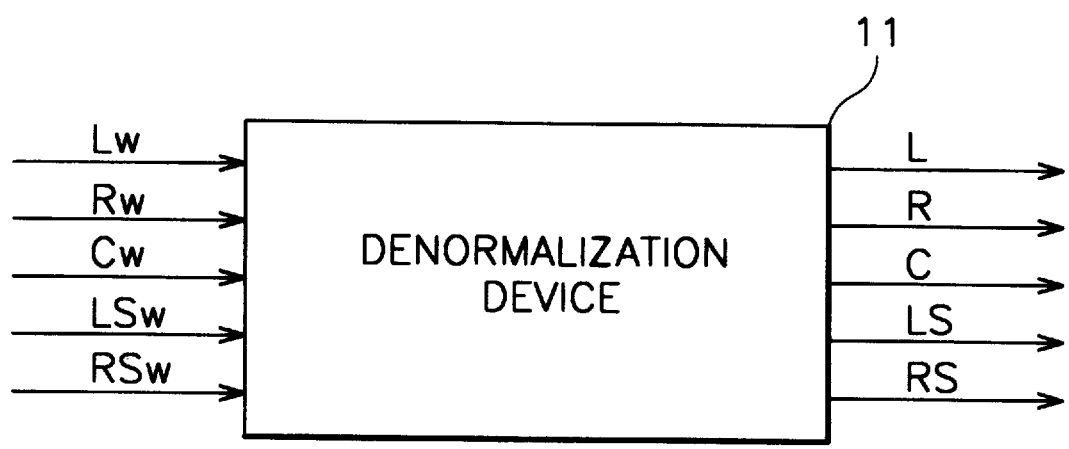
FIG. 1 is a schematic block diagram illustrating the construction of a denormalization device for a multichannel audio decoder in accordance with an embodiment of the present invention.
Figure 2:
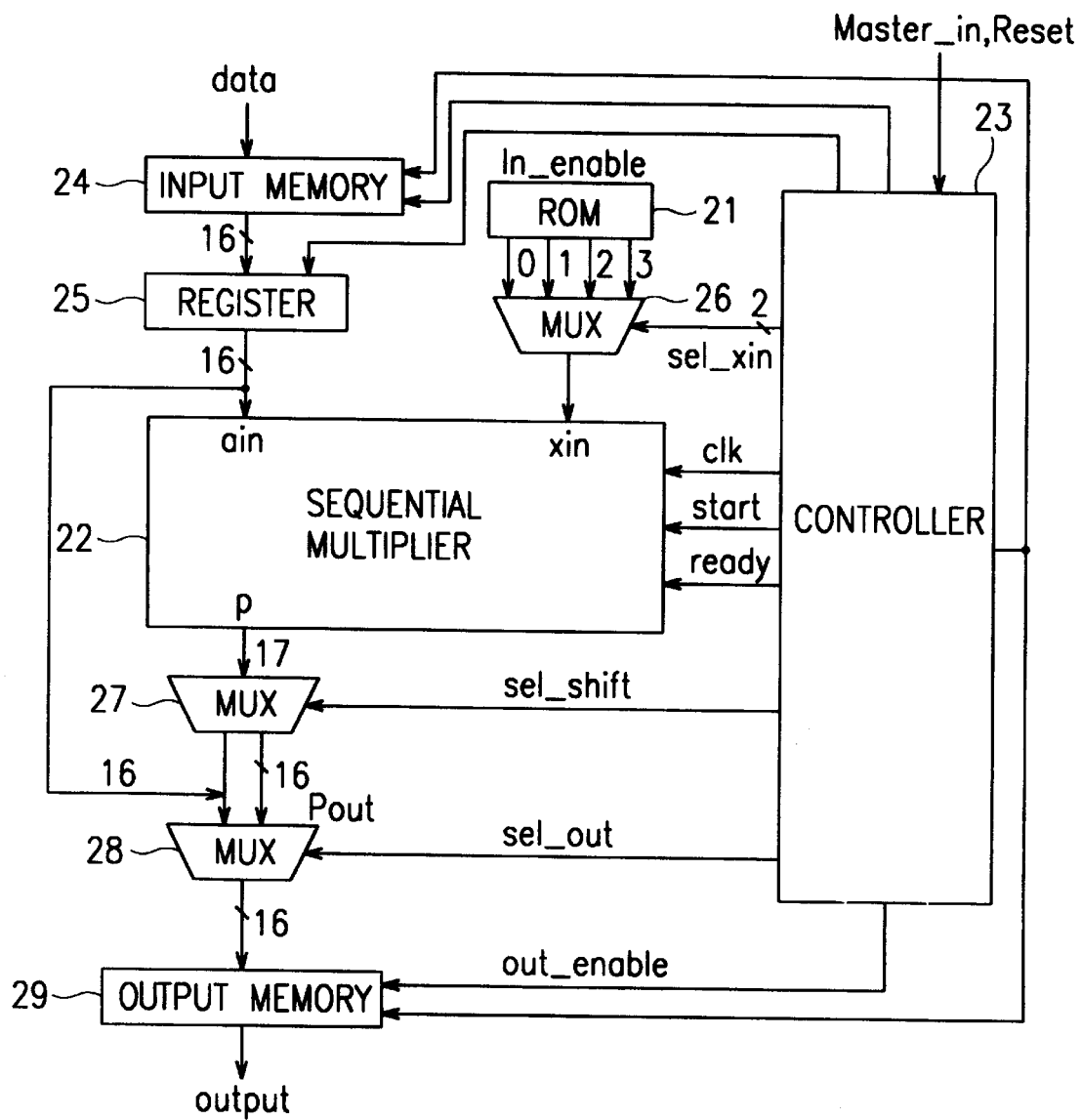
FIG. 2 is a detailed block diagram of the denormalization device in FIG. 1.

FIG. 1 is a schematic block diagram illustrating the construction of a denormalization device for a multichannel audio decoder in accordance with an embodiment of the present invention and FIG. 2 is a detailed block diagram of the denormalization device in FIG. 1.

As shown in FIG. 2, the denormalization device comprises a read only memory (referred to hereinafter as ROM) 21 for storing therein denormalization information to be multiplied by data to be denormalized, an input memory 24 for inputting the data to be denormalized and storing the input data therein, a register 25 for storing output data from the input memory 24 therein and outputting the stored data in a synchronous manner, a multiplexer 26 for selecting one of the stored denormalization information in the ROM 21 corresponding to the input data, a sequential multiplier 22 for multiplying output data from the register 25 by the denormalization information selected by the multiplexer 26, a controller 23 for controlling the ROM 21 and the sequential multiplier 22, and an output memory 29 for storing output data from the sequential multiplier 22 therein.

The sequential multiplier 22 is adapted to perform a multiplication operation with respect to 16-bit signed and unsigned numbers. In the case where two factors as the denormalization information or the inverse weighting factor A and denormalization factor B in the above table 1 are multiplied by each other, a combination of five coefficients, with the exception of 1, namely, $1+\sqrt{2}$, $2+\sqrt{2}$, $1.5+0.5\sqrt{2}$, $3+\sqrt{2}$ and $1+1.5\sqrt{2}$ is produced. Because the produced combination has a maximum value between 4 and 8, a part below decimal point is defined by 15 bits and an integer part is defined by 3 bits when an unsigned number is used. As a result, the produced combination requires the total 18 bits. Also, each input channel value is defined by 16 bits resulting from adding a 1-bit signed number to 15 bits below decimal point.

Because the denormalized signals are generally not beyond the range of −1 to 1, the result can be obtained by taking only one bit above decimal point. Also, the total 16 bits are required as output. As a result, the output can be obtained by taking one bit above decimal point and 15 bits below decimal point.

The controller 23 includes an address decoding control logic for determining a memory address, an input control logic for determining the input of data from the input memory 24, an output control logic for storing the denormalized result into the output memory 29, a dematrixing control logic for determining an dematrixing operation, a factor determination control logic for determining a factor to be multiplied by the input data, and an output determination control logic for determining an output value.

The denormalization operation in the address decoding process is performed in the unit of 32 subbands. In this case, 5 bits are required. Because two different decoding devices share one memory, two memory locations (two pages) are used to avoid a busy state due to the memory share of the two devices. In this case, one bit is required. The number of used memories is 6 for five channels and one control word. In this case, 3 bits are required. As a result, a 9-bit address controller is used to decode an address satisfying the above conditions.

An input enable signal in_enable and an output enable signal out_enable are used to determine whether the present address is an input address or an output address. The use of such signals has the effect of preventing unnecessary power consumption by disabling both the input and output memories 24 and 29, respectively, when they are not used.

In the case where the input enable signal in_enable is high in logic, the input data is read from the input memory 24 and then latched in the register 25 in response to a load signal and a clock signal. In the case where the output enable signal out_enable is high in logic, the output data is stored into the output memory 29. When an external master in signal master_in is high in logic, the denormalization operation is performed with respect to 32 subbands. At this time, the denormalization operation is performed in the order of 32 subbands. Namely, the denormalization device determines the dematrixing operation with respect to the first subband and performs the denormalization operation in the order of channels Lw, Rw, Cw, LSw and RSw in accordance with the determined result. Then, the denormalization device performs the above-mentioned process with respect to the subsequent subband. Upon completing the denormalization operation with respect to 32 subbands, the denormalization device remains at its initial state until it receives the next master in signal master_in. When the denormalization device receives the next master in signal master_in, it performs the above-mentioned process with respect to another memory page.

In the dematrixing operation determination process, an address decoding device generates a 3-bit address to designate a control word and each channel memory. If the 3-bit address is "000", it designates the control word. At this time, the input data from the memory contains information regarding the dematrixing operation. The information is latched as a dematrixing operation signal in the controller 23 and is then constantly maintained with respect to one subband so that the denormalization operation can be performed with respect to each channel in response to the dematrixing operation signal. The denormalization information xin is determined as shown in the table 1 according to the dematrixing operation and channels.

As shown in the table 1, the total five values are obtained by multiplying the two factors. Here, only four of the five values are used. In the case where the values $1.5+0.5\sqrt{2}$ and $3+\sqrt{2}$ are expressed in binary number, it can be seen that the one-bit shift relation is present therebetween. In this connection, in the denormalization device of the present invention, only four data x0 $(1+\sqrt{2})$, x1 $(2+\sqrt{2})$, x2 $(3+\sqrt{2})$ and x3 $(1+1.5\sqrt{2})$ are used as the inputs to the sequential multiplier 22. As a result, in the case where the data $1.5+\sqrt{2}$ is to be used as the input to the sequential multiplier 22, the data $3+\sqrt{2}$ is used instead as the input to the sequential multiplier 22. In this case, the denormalized value is obtained by shifting the multiplied result from the sequential multiplier 22 by one bit.

A 2-bit control signal sel_xin is used to select the denormalization information xin. In the case where the dematrixing operation signal is "00" or "10", the 2-bit control signal sel_xin is decoded into "00" (x0) with respect to the channels Lw and Rw and "01" (x1) with respect to the channels Cw, LSw and RSw. In the case where the dematrixing operation signal is "01", the 2-bit control signal sel_xin is decoded into "10" (x2) with respect to the channels Lw, Rw, LSw and RSw and "11" (x3) with respect to the channels Cw. In the case where the dematrixing operation signal is "11", any multiplication operation is not performed because the denormalization information xin is "1". In this case, the input value is transferred directly to the output stage.

If all input data to the sequential multiplier 22 are ready, the sequential multiplier 22 multiplies the given input data ain by the selected denormalization information xin to obtain the result p. At this time, the controller 23 generates a start pulse signal which remains at its high logic state for one clock period to indicate the start of the multiplication operation and applies the generated start pulse signal to the sequential multiplier 22. Then, the sequential multiplier 22 performs the multiplication operation with respect to the input data ain and the denormalization information xin in response to the start pulse signal from the controller 23. If the multiplication operation is ended, the sequential multiplier 22 makes a ready signal high in logic to inform the controller 23 of the end of the multiplication operation.

The output value p from the sequential multiplier 22 is expressed in 30 bits below decimal point and 4 bits above decimal point. However, because the denormalized value is generally not beyond the range of −1 to 1 and the desired number of output bits is 16, the actual output value $p_{out}$ is obtained by taking, from the output value p from the sequential multiplier 22, only one bit above decimal point and 31st to 16th bits below decimal point in the case where no separate weighting factor is present.

On the other hand, in the case where the dematrixing operation signal is "01" and the channels are Lw and Rw, the input value to the sequential multiplier 22 is twice the original. As a result, the output value from the sequential multiplier 22 must be divided by 2. In this case, 32nd to 17th bits of the output value p from the sequential multiplier 22 are selected as the actual output value $p_{out}$. A 1-bit control signal sel_shift is set to "0" in the former case and "1" in the latter case.

In the case where the dematrixing operation signal is "11", the input data is transferred directly as the output data. In other cases, the actual output value $p_{out}$ is transferred as the output data. A 1-bit control signal sel_out is set to "0" in the case where the dematrixing operation signal is "11" and "1" in other cases.

As is apparent from the above description, according to the present invention, the denormalization device performs the denormalization operation on the basis of one multiplication operation. Therefore, the denormalization device of the present invention has the effect of making the process simple and shortening the processing time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A denormalization device for a multichannel audio decoder, comprising:

denormalization information storage means for storing therein denormalization information to be multiplied by data to be denormalized;

multiplication means for multiplying the data to be denormalized, by the denormalization information stored in said denormalization information storage means;

control means for controlling said denormalization information storage means and said multiplication means; and control logic means for using four data $(1+\sqrt{2})$, $(2+\sqrt{2})$, $(3+\sqrt{2})$ and $(1+1.5\sqrt{2})$ of the denormalization information provided from the denormalization information storage means as inputs to said multiplication means and, in the case where data $1.5+0.5\sqrt{2}$ is to be used as an input to said multiplication means, using the data $3+\sqrt{2}$ instead as the input to said sequential multiplication and shifting the multiplied result from said multiplication means by one bit to obtain a denormalized value.

2. A denormalization device for a multichannel audio decoder, as set forth in claim 1, wherein each of the denormalization information stored in said denormalization information storage means is the result obtained by multiplying an inverse weighting factor and a denormalization factor, whereby a denormalization operation can be performed on the basis of one multiplication operation of said multiplication means.

3. A denormalization device for a multichannel audio decoder, as set forth in claim 1, further comprising:

an input memory for inputting the data to be denormalized and storing the input data therein; and a register for storing output data from said input memory therein and outputting the stored data to said multiplication means in a synchronous manner.

4. A denormalization device for a multichannel audio decoder, as set forth in claim 1, further comprising:

a multiplexer for selecting one of the stored denormalization information in said denormalization information storage means corresponding to the input data and outputting the selected denormalization information to said multiplication means; and an output memory for storing output data from said multiplication means therein.

5. A denormalization device for a multichannel audio decoder, as set forth in claim 1, wherein the control means includes address decoding control logic means for using two memory locations to avoid a busy state occurring when two different decoding devices share one memory, and the denormalization device further comprising input/output address ports for reducing power consumption.

6. A denormalization method for a multichannel audio decoder, comprising the steps of:

inputting data to be denormalized;

storing in a denormalization information storage means, denormalization information to be multiplied by data to be denormalized, wherein all the denormalization information stored in said denormalization information storage means is obtained by multiplying an inverse weighing factor and a denormalization factor in a multiplication means:

extracting denormalization information to be multiplied by the input data;

multiplying the input data by the extracted denormalization information; and further comprising control logic means for using four data $(1+\sqrt{2})$, $(2+\sqrt{2})$, $(3+\sqrt{2})$ and $(1+1.5\sqrt{2})$ of the denormalization information provided from the denormalization information storage means as inputs to said multiplication means and, in the case where data $1.5+0.5\sqrt{2}$ is to be used as an input to said multiplication means, using the data $3+\sqrt{2}$ instead as the input to said sequential multiplication and shifting the multiplied result from said multiplication means by one bit to obtain a denormalized value.

* * * * *